(12) United States Patent
Sundström et al.

(10) Patent No.: US 11,130,075 B2
(45) Date of Patent: Sep. 28, 2021

(54) METHOD AND SYSTEM FOR PURIFICATION OF SLOP OIL AND INDUSTRIAL EMULSIONS COMPRISING TWO PROCESSES RUN IN PARALLEL

(71) Applicant: ROCCO Slop AB, Östersund (SE)

(72) Inventors: Fred Sundström, Östersund (SE); Thomas Persson, Östersund (SE); Fredrik Ajnefors, Stockholm (SE)

(73) Assignee: ROCCO Slop AB, Östersund (SE)

( * ) Notice: Subject to any disclaimer, the term of this patent is extended or adjusted under 35 U.S.C. 154(b) by 421 days.

(21) Appl. No.: 16/301,348

(22) PCT Filed: May 8, 2017

(86) PCT No.: PCT/SE2017/050454
§ 371 (c)(1),
(2) Date: Nov. 13, 2018

(87) PCT Pub. No.: WO2017/196234
PCT Pub. Date: Nov. 16, 2017

(65) Prior Publication Data
US 2020/0230520 A1 Jul. 23, 2020

(30) Foreign Application Priority Data
May 10, 2016 (SE) .................................... 1650627-1

(51) Int. Cl.
*B01D 17/02* (2006.01)
*B01D 17/04* (2006.01)
(Continued)

(52) U.S. Cl.
CPC ....... *B01D 17/0217* (2013.01); *B01D 17/047* (2013.01); *B01D 17/12* (2013.01);
(Continued)

(58) Field of Classification Search
CPC .. B01D 17/0217; B01D 17/047; B01D 17/12; B01D 17/04; B01D 2214/14;
(Continued)

(56) References Cited

U.S. PATENT DOCUMENTS

| 1,951,739 | A | * | 3/1934 | Rodman | .................. | H01B 3/22 |
| | | | | | | 208/186 |
| 3,265,212 | A | * | 8/1966 | Bonsall, Jr. | .......... | C10M 175/04 |
| | | | | | | 210/787 |

(Continued)

FOREIGN PATENT DOCUMENTS

| CA | 2 747 909 A1 | 5/2010 |
| DE | 199 37 989 A1 | 2/2001 |

(Continued)

*Primary Examiner* — Joseph W Drodge
(74) *Attorney, Agent, or Firm* — Dilworth & Barrese, LLP

(57) ABSTRACT

A purification system and a method for purification of slop oil and industrial emulsions, wherein the purification system can handle two processes in parallel, a slop oil purification process and an industrial emulsion purification process, said system comprising: —at least one slop oil centrifugal separator (5) into which slop oil is provided for separation of water and oil; —at least one emulsion centrifugal separator (25) into which an industrial emulsion is provided for separation of oil and water; —a first redirecting fluid connection (37, 37') arranged for transferring oil separated from the industrial emulsion in the emulsion centrifugal separator (25) to the slop oil centrifugal separator (5) possibly via a slop oil tank (3).

17 Claims, 3 Drawing Sheets

(51) Int. Cl.
  *B01D 17/12*     (2006.01)
  *B01D 21/26*     (2006.01)
  *C10G 33/04*     (2006.01)
  *C10G 33/06*     (2006.01)
  *C10G 33/08*     (2006.01)
  *C10M 175/04*    (2006.01)
  *B04B 11/04*     (2006.01)
  *C02F 1/38*      (2006.01)
  *C10M 175/00*    (2006.01)

(52) U.S. Cl.
  CPC ............ *B01D 21/262* (2013.01); *B04B 11/04* (2013.01); *C02F 1/38* (2013.01); *C10G 33/04* (2013.01); *C10G 33/06* (2013.01); *C10G 33/08* (2013.01); *C10M 175/0058* (2013.01); *C10M 175/04* (2013.01)

(58) Field of Classification Search
  CPC .... B01D 21/26; B01D 21/262; B01D 21/265; B01D 21/267; C10G 33/04; C10G 33/06; C10G 33/08; C10G 33/00; C10M 175/0058; C10M 175/04; C02F 1/40; C02F 1/38; B04B 11/00; B04B 11/02; B04B 11/04; B04B 11/06; B04B 13/00
  USPC ................................................ 210/512.1, 787
  See application file for complete search history.

(56) References Cited

U.S. PATENT DOCUMENTS

| | | | |
|---|---|---|---|
| 4,948,393 A | | 8/1990 | Hodson et al. |
| 4,990,237 A | * | 2/1991 | Heuer .................... C10G 31/00 208/13 |
| 5,053,082 A | * | 10/1991 | Flanigan ............ B01D 11/0223 134/25.1 |
| 5,269,906 A | * | 12/1993 | Reynolds ............... B01D 17/00 208/13 |
| 5,948,242 A | | 9/1999 | Ohsol et al. |
| 5,948,271 A | * | 9/1999 | Wardwell ................ B04B 11/02 210/739 |
| 6,074,549 A | * | 6/2000 | Bacon Cochrane ..... C10G 1/01 208/390 |
| 6,132,630 A | | 10/2000 | Briant et al. |
| 6,527,960 B1 | * | 3/2003 | Bacon ................ B01D 17/0214 210/741 |
| 10,493,383 B2 | * | 12/2019 | Teodorescu .......... B01D 21/305 |
| 2006/0000787 A1 | * | 1/2006 | Galasso, III .......... C10G 31/10 210/774 |
| 2011/0174695 A1 | * | 7/2011 | Goldman ................. C10G 7/04 208/390 |
| 2013/0098805 A1 | | 4/2013 | Bjornson et al. |
| 2014/0224640 A1 | | 8/2014 | Fincher et al. |
| 2015/0072850 A1 | * | 3/2015 | Derrick ................. B04B 1/2016 494/8 |
| 2015/0322348 A1 | * | 11/2015 | Dasgupta ............... C10G 1/045 208/401 |
| 2016/0052799 A1 | | 2/2016 | Grave et al. |
| 2016/0122209 A1 | * | 5/2016 | Newman, Jr. ...... B01D 17/0214 210/744 |
| 2017/0029716 A1 | * | 2/2017 | Dasgupta ............. B01D 1/0082 |

FOREIGN PATENT DOCUMENTS

| | | | |
|---|---|---|---|
| EP | 0693544 A2 | | 1/1996 |
| EP | 2181744 A1 | | 5/2010 |
| GB | 1294861 | * | 11/1972 ............. B04B 11/00 |

\* cited by examiner

METHOD AND SYSTEM FOR PURIFICATION OF SLOP OIL AND INDUSTRIAL EMULSIONS COMPRISING TWO PROCESSES RUN IN PARALLEL

TECHNICAL FIELD OF THE INVENTION

The present invention relates to a method and a system for purification of slop oil and industrial emulsions.

BACKGROUND OF THE INVENTION

Purification of oils, such as for example slop oil and waste oil is important for the possibility to reuse oils and therefore an important factor for the environmental future and the limited nature resources of oils. Purification of slop oil is problematic in many ways. Slop oil can comprise oil, water, particles and emulsions. The particles can stabilize the emulsions and complicate a purification process. Purification of industrial emulsions comprising water and oil, such as for example cutting fluids is also an important environmental issue.

SUMMARY

An object of the present invention is to improve efficiency in purification processes for slop oils and industrial emulsions.

This is achieved in a method for purification of slop oil and industrial emulsions comprising two processes run in parallel, a slop oil purification process and an industrial emulsion purification process, the slop oil purification process comprising the steps of:
  providing slop oil to a slop oil centrifugal separator;
  separating water and oil in the slop oil centrifugal separator;
  the industrial emulsion purification process comprising the steps of:
    providing an industrial emulsion to an emulsion centrifugal separator;
    separating oil and water in the emulsion centrifugal separator;
    forwarding the oil separated in the emulsion centrifugal separator to be further processed in the slop oil purification process.

It is also achieved in a purification system for purification of slop oil and industrial emulsions, said system comprising:
  at least one slop oil centrifugal separator into which slop oil is provided for separation of water and oil;
  at least one emulsion centrifugal separator into which an industrial emulsion is provided for separation of oil and water;
  a first redirecting fluid connection arranged for transferring oil separated from the industrial emulsion in the emulsion centrifugal separator to the slop oil centrifugal separator possibly via a slop oil tank.

Hereby the slop oil purification process and the industrial emulsions purification process can be combined in the same system and be used for further purification of end products retrieved from the other process. Hereby quality will be improved in end products retrieved from the system and effectivity in the purification processes will be increased. Overall an improved purification process for slop oil and industrial emulsions will be achieved.

In one embodiment of the invention the method further comprises the step of adding a first chemical booster to the slop oil before it is provided to the slop oil centrifugal separator. Possibly also the industrial emulsion purification process further comprises the step of adding a second chemical booster to the industrial emulsion before it is provided to the emulsion centrifugal separator.

Hereby separation efficiency can be improved.

In one embodiment the slop oil purification process further comprises the step of forwarding water separated out from the slop oil in the slop oil centrifugal separator to be further processed in the industrial emulsion purification process. Thus the purification system further comprises a second redirecting fluid connection arranged for transferring water separated out from the slop oil in the slop oil centrifugal separator to the emulsion centrifugal separator possibly via an industrial emulsions tank.

Hereby also the water separated out from the slop oil in the slop oil purification process can be further purified by use of the industrial emulsion purification part of the system.

Further embodiments of the invention are described in the dependent claims.

DETAILED DESCRIPTION OF THE EMBODIMENTS

Figure 1:
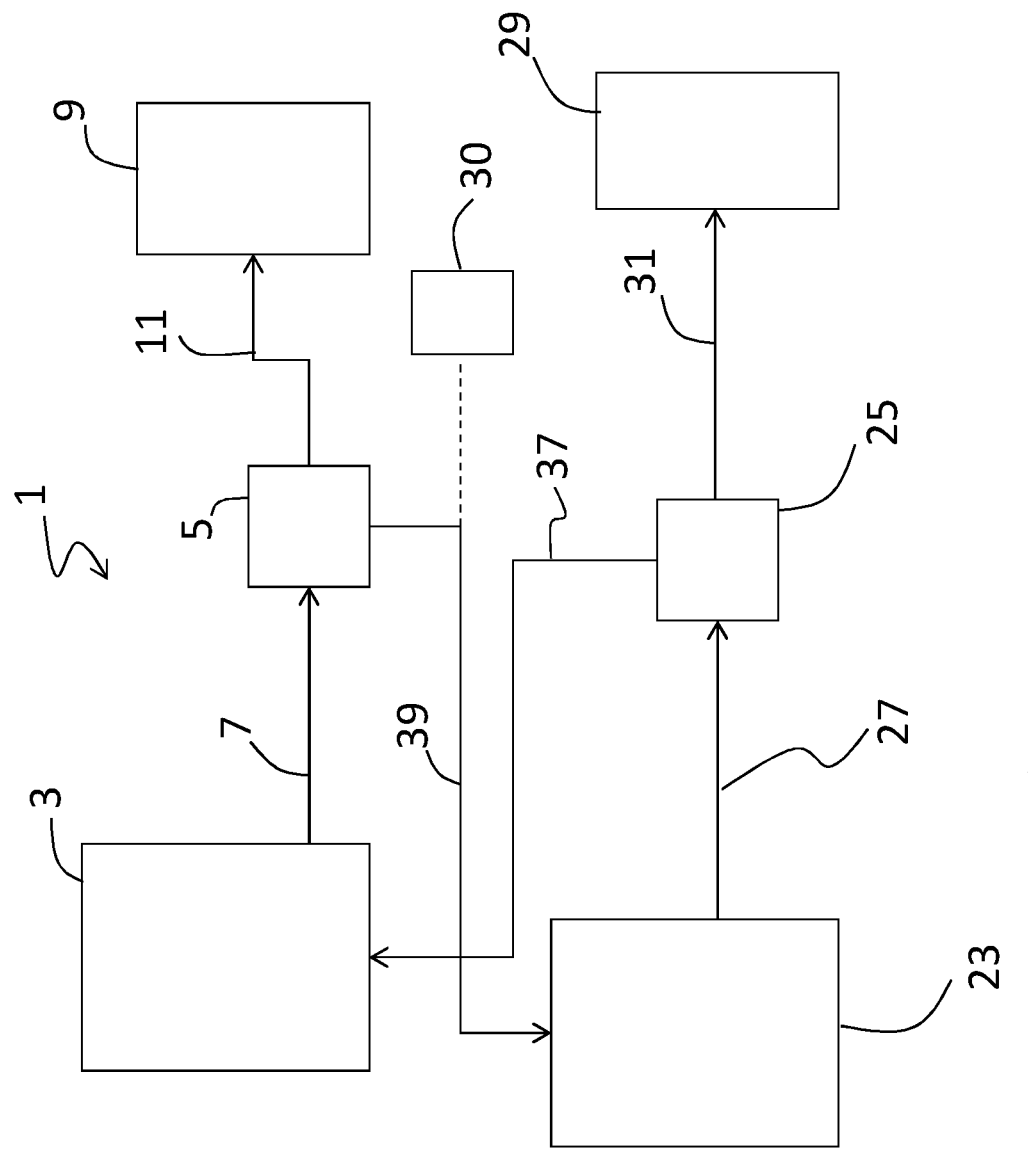
FIG. 1 shows schematically a system for purification of slop oil and industrial emulsions according to one embodiment of the invention.

FIG. 1 shows schematically a purification system 1 for purification of slop oil and industrial emulsions according to one embodiment of the invention. The purification system according to the invention can handle two processes in parallel, a slop oil purification process and an industrial emulsions purification process. The term slop oil as used in this text and in the claims is meant to cover different mixes of oil, water, solid impurities and emulsion phase of oil and water. Waste oil is another term commonly used. The term industrial emulsions as referred to in the text and in the claims of the present patent application is meant to cover industrial emulsions of water and oil, such as for example cutting fluids. The slop oil purification process part of the system comprises at least one slop oil tank 3 in which slop oil to be purified is provided. The number of slop oil tanks can be varied in dependence of the wanted capacity of the system. The slop oil purification process part of the system 1 comprises further at least one slop oil centrifugal separator 5 into which slop oil is provided for separation of water and oil. A first fluid connection 7 is hereby provided between the at least one slop oil tank 3 and the at least one slop oil centrifugal separator 5. An oil tank 9 is also shown connected to the slop oil centrifugal separator 5 for the storing of the separated oil retrieved therefrom after the centrifugal process. Hereby also a second fluid connection 11 is provided between the slop oil centrifugal separator 5 and the oil tank 9.

The industrial emulsions purification process part of the purification system comprises at least one industrial emulsions tank 23 in which industrial emulsions of water and oil to be purified is provided. The number of industrial emulsions tanks can be varied in dependence of the wanted capacity of the system. This part of the system 1 comprises further at least one emulsion centrifugal separator 25 into which the industrial emulsions is provided for separation of oil and water. A third fluid connection 27 is hereby provided between the at least one industrial emulsions tank 23 and the at least one emulsion centrifugal separator 25. A water tank 29 is also shown connected to the emulsion centrifugal separator 25 for the storing of the separated water retrieved therefrom after the centrifugal process. Hereby also a fourth fluid connection 31 is provided between the emulsion centrifugal separator 25 and the water tank 29

According to the invention the purification system further comprises a first redirecting fluid connection 37 arranged for transferring oil separated from the industrial emulsion in the emulsion centrifugal separator 25 to one of the at least one slop oil tanks 3 for further purifying in the slop oil purification part of the system.

According to one embodiment of the invention water retrieved from the separation of slop oil in the slop oil centrifugal separator 5 can be transferred to one of the at least one industrial emulsions tanks 23 for further purifying in the industrial emulsion purification process part of the system. Hereby a second redirecting fluid connection 39 can be provided between an outlet of the slop oil centrifugal separator 5 and one of the at least one industrial emulsions tanks 23. This step is however an optional step of the invention. In another embodiment of the invention the water separated from the slop oil in the slop oil centrifugal separator 5 may instead be transferred to a water tank 30.

Figure 2:
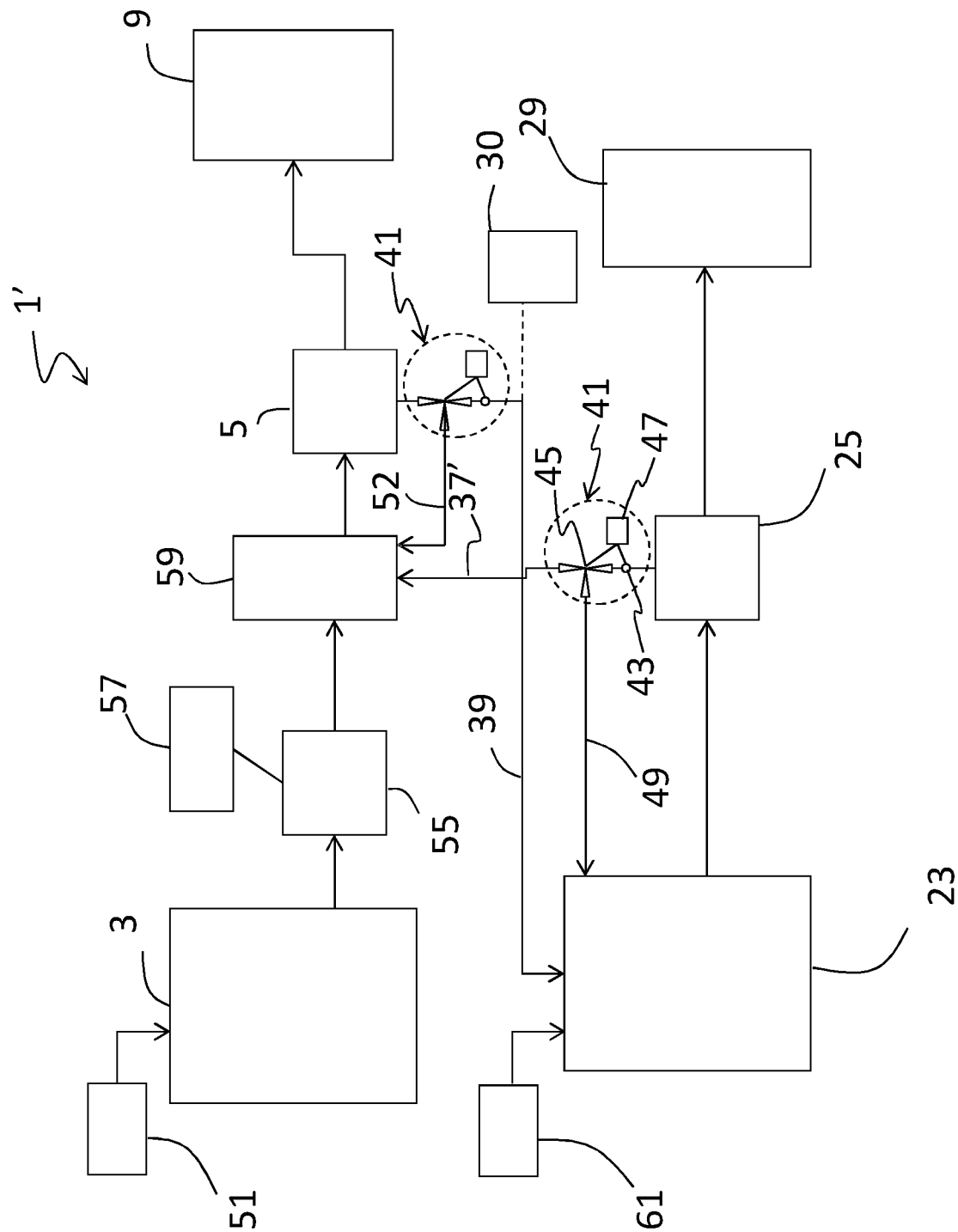
FIG. 2 shows schematically a system for purification of slop oil and industrial emulsions according to one embodiment of the invention.

FIG. 2 shows schematically a system 1' for purification of slop oil and industrial emulsions according to another embodiment of the invention. In this embodiment a few more optional parts of the system are shown. However the basic parts: slop oil tank 3, industrial emulsions tank 23, slop oil centrifugal separator 5, emulsion centrifugal separator 25, the oil tank 9, the water tank 29 and most of the fluid connection named and numbered in relation to FIG. 1 are the same also in this embodiment and will therefore also be named and numbered in accordance with the system described in FIG. 1.

In this embodiment of the invention there is provided a first booster adding means 51 arranged for providing a first chemical booster to the slop oil in the at least one slop oil tank 3. Such a first chemical booster could also be added to the slop oil in the slop oil tank 3 of the embodiment shown in FIG. 1. The first chemical booster can be in the form of a demulsifier which can destabilize an emulsion phase in the slop oil and facilitate separation of water and solids and/or salts from the oil. The use of a chemical booster can improve the separation effectivity. By waiting and possibly warming the slop oil tank 3 the separation of oil, water and contaminating particles in the slop oil will start already in the slop oil tank 3. In this embodiment another type of centrifugal separator will be provided before the slop oil centrifugal separator 5 as described in relation to FIG. 1. This is a decanter centrifuge separator 55 which is connected to an outlet of the slop oil tank 3. This decanter centrifuge separator 55 will separate contaminating particles and sludge from the slop oil. A particle and sludge tank 57 is provided connected to the decanter centrifugal separator 55 for the collection of the contaminating particles and sludge separated from the slop oil. The oil which after the decanter centrifugal separator has been purified from contaminating particles and sludge is forwarded to a second slop oil tank 59. This oil will be further transferred from the second slop oil tank 59 for further purification in the slop oil centrifugal separator 5. Possibly a chemical booster can be added also in the second slop oil tank 59 for further improving separation effectivity. Water which is separated from the oil in the slop oil centrifugal separator 5 can as described in relation to FIG. 1 be transferred through a second redirecting fluid connection 39 to the industrial emulsions tank 23 for further purification in the emulsion purification part of the process or alternatively to a water tank 30. Oil retrieved after centrifugal separation in the slop oil centrifugal separator 5 will be transferred to an oil tank 9.

In another embodiment of the invention the oil retrieved after the decanter centrifugal separator 55 can instead be transferred back to one of the initial slop oil tanks 3 for further treating with chemical booster and warming before it is taken to the decanter centrifugal separator 55 a second time.

In the industrial emulsions purification process part of the system most parts are the same as described in relation to the embodiment described in FIG. 1. However a second booster adding means 61 is here shown connected to the industrial emulsions tank 23 arranged for providing a second chemical booster to the industrial emulsion before it is provided to the emulsion centrifugal separator 25. The second chemical booster can be a water cleaning product which will improve the separation of oil contaminants from water. This is an optional part of the process which also could be provided to the embodiment shown in relation to FIG. 1. Furthermore the oil retrieved after separation in the emulsion centrifugal separator 25 is transferred through a first redirecting fluid connection 37' to the second slop oil tank 59 for further purification in the slop oil purification process part of the system. Hereby, the oil retrieved from the industrial emulsion purification process will be automatically transferred for further purification in the slop oil purification part of the process and the end product will be a better purified oil. With this combined purification a more effective purification is achieved and a better quality of the end product.

The transferring of slop oil, industrial emulsions, oil and water in the system as described in relation to FIGS. 1 and 2 requires a number of pumps. A person skilled in the art would understand where to provide the pumps for achieving the flows as described above. Pumps can also be provided for recirculating the contents inside the tanks, for example the content in the slop oil tanks 3 and the industrial emulsions tanks 23 for improving mixing of added chemical booster in the content of the tanks. The pumps can for example be displacement pumps or mono pumps.

The tanks in the system can also in one embodiment of the invention be provided with heating means for heating the tanks. The heating means can for example be steam coils provided inside the tanks. Heating the content in the tanks can improve separation effectivity. The viscosity of the oils will be lowered for higher temperatures and that will facilitate separation. Furthermore density differences between oil and water can be increased by heating which will be advantageous for separation.

In FIG. 2 one more optional feature of the invention is shown. This is a redirection arrangement 41 which can be provided in a fluid line at different positions in the system. In FIG. 2 it is shown at two different positions actually in the first and second redirection fluid connections 37', 39 but it could be provided also in other positions. This redirection arrangement 41 could also be provided for example in the first and second redirection fluid connections 37, 39 in the embodiment shown in FIG. 1. The redirection arrangement 41 comprises a sensor 43 arranged to be provided in a fluid line, a three way valve 45 arranged to be provided in the same fluid line and further connected to another fluid line and a control system 47 connected to both the sensor and the three way valve 45 and arranged to control the three way valve 45 in dependence of sensor output. The sensor 43 is arranged for sensing properties of the fluid in the fluid line where it is provided such that fluid automatically can be directed to a proper destination in dependence of the sensor output. In the embodiment shown in FIG. 2 the redirection arrangement 41 is provided in the first redirection fluid connection 37'. An extra fluid line 49 is hereby provided in the system connected to one of the valve connections in the three way valve 45 of the redirection arrangement 41. This extra fluid line 49 is also connected to the at least one industrial emulsions tank 23. Hereby it is possible to redirect fluid coming from the emulsion centrifugal separator 25 on its way to the slop oil processing part of the system (the second slop oil tank 59) back to the industrial emulsions tank 23 if the sensor 43 detects water or detects that the oil content of the fluid is too low. A further redirection arrangement 41 is in FIG. 2 shown to be provided in the second redirection fluid connection 39. An extra fluid line 52 is thus also provided connected to one of the valve connections of the three way valve and to the second slop oil tank 59 for making it possible to redirect fluid coming from the slop oil centrifugal separator 5 back to the second slop oil tank 59 if the sensor of the redirection arrangement 41 detects oil or detects that the oil content is too big in the fluid on its way to the industrial emulsion processing part of the system (industrial emulsions tank 23). The sensors could for example be a sensor measuring dielectric differences of the fluid. Such a sensor could be based on capacitive or microwave measurement technology. Another type of sensor that could be used is a sensor measuring density via a vibrating fork. Other types of sensors are also possible.

This redirection arrangement 41 could also be connected to a warning system providing an alarm signal or even providing an automatic stop of the centrifuge operation if oil is detected in the water outlet from the slop oil centrifugal separator 5. The redirection arrangement 41 could also be connected to a control system reducing the flow into the centrifugal separator if oil is detected in the water outlet.

Figure 3:
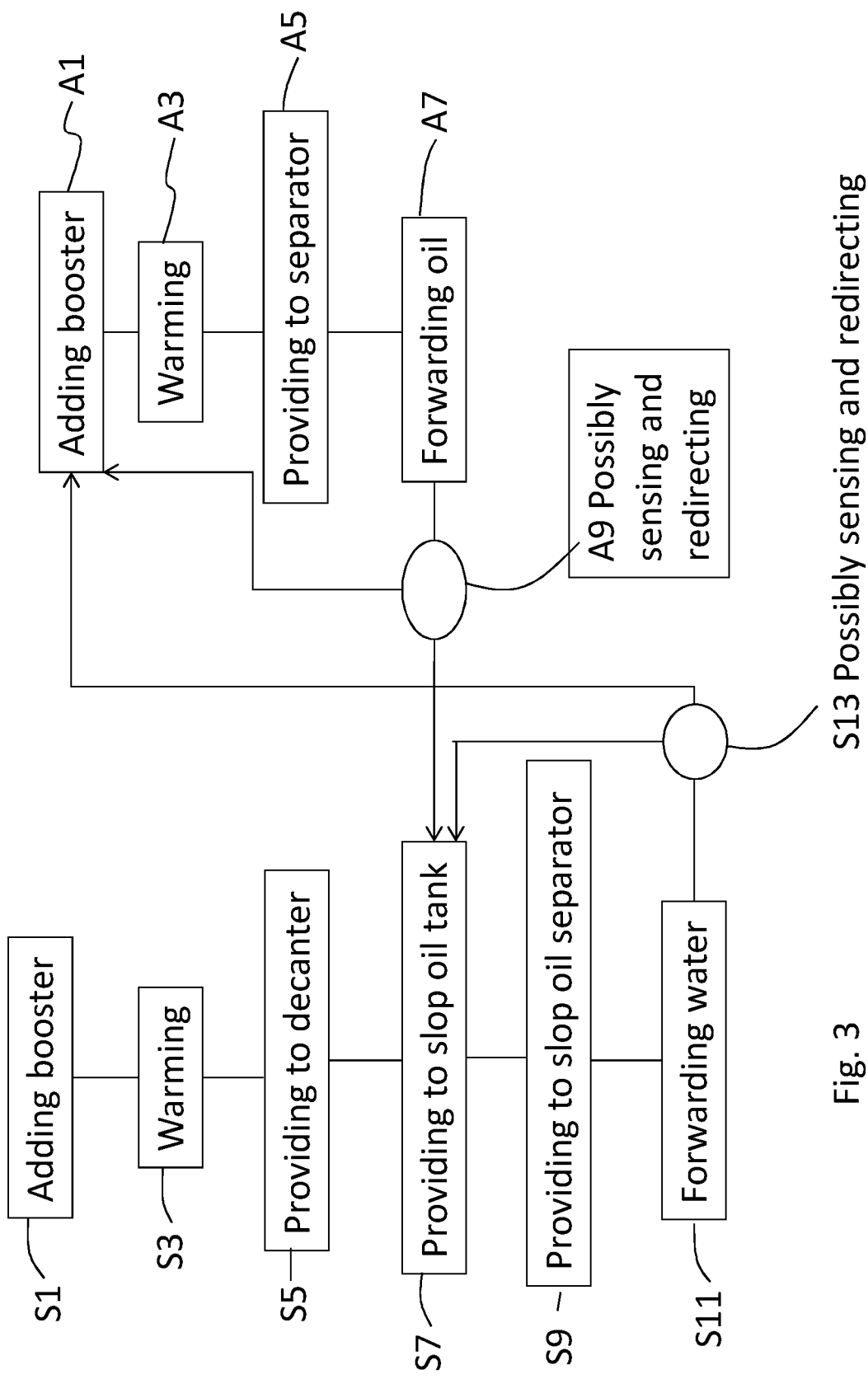
FIG. 3 shows a flow chart of a method according to one embodiment of the invention.

FIG. 3 shows a flow chart of a method according to one embodiment of the invention. The method steps are described below. There are two processes run in parallel, a slop oil purification process, described by some or all of the steps S1-S13 and an industrial emulsion purification process, described by some or all of the steps A1-A9.

The slop oil purification process:

S1: Adding a first chemical booster to the slop oil which is provided in a slop oil tank 3. This step is optional in the process.

S3: Warming the slop oil by warming the slop oil tank 3 in which the slop oil is provided and into which the chemical booster possibly has been provided. The warming of the slop oil possibly together with the chemical booster will improve separation efficiency. This step is optional in the process.

S5: Providing the slop oil to a decanter centrifuge 55 for separating particles and sludge from the slop oil. This step is optional in the process. If the content of particles and sludge in the oil to be purified is low the decanter centrifuge may not be necessary.

S7: Providing the partly purified slop oil to a second slop oil tank 59 and providing the sludge and particles to another tank.

S9: Providing the partly purified slop oil from the second slop oil tank to a slop oil centrifugal separator 5 for separating water and oil.

S11: Forwarding water separated out from the slop oil in the slop oil centrifugal separator 5 to be further processed in the industrial emulsion purification process. This step is optional in the process.

The industrial emulsion purification process:

A1: Adding a second chemical booster to the industrial emulsion which is provided in an industrial emulsions tank 23. This step is optional in the process.

A3: Warming the industrial emulsion by warming the industrial emulsion tank 23 in which the industrial emulsion is provided and into which the chemical booster possibly is provided. The warming of the emulsion possibly together with the chemical booster will improve separation efficiency. This step is optional in the process.

A5: Providing the industrial emulsion to an emulsion centrifugal separator 25 for separating oil and water.

A7: Forwarding the oil separated in the emulsion centrifugal separator 25 to be further processed in the slop oil purification process.

A9: An optional step of sensing a property of the oil separated in the emulsion centrifugal separator 25 on its way to the slop oil tank 3 and possibly redirecting the oil back to the industrial emulsions tank 23 (the beginning of the industrial emulsion purification process) can also be provided. A sensor is provided in the fluid line and an output from the sensor can be indicative of the content of the fluid, for example if the content is oil or water or if oil or water content is below a certain threshold. This was described above in relation to FIGS. 1 and 2 and was called redirection arrangement 41. Such a redirection arrangement can be provided in more positions of the system. For example also after step S11 for sensing S13 if the water forwarded to the industrial emulsion purification process comprises a correct amount of water or if it should be directed back for further purification in the slop oil purification process instead.

The method according to the invention comprises two parallel purification processes which can be combined. Hereby oil retrieved from the industrial emulsion purification process will be automatically transferred for further purification in the slop oil purification process. By combining these two processes the efficiency in purification and the quality of end products are improved.

The purification system 1; 1' according to the invention further comprises a control system which is configured for controlling the purification system to perform the method according to the invention as described above. The control system is connected to pumps, valves and sensors in the purification system in order for controlling the flows in the system. The invention further comprises a computer program product comprising instructions which, when executed in a processor in the control system in the purification system of the invention, cause the control system to perform the method as described above.

The invention claimed is:

1. A method for purification of slop oil and an industrial emulsion comprising two processes run in parallel, a slop oil purification process and an industrial emulsion purification process, wherein the slop oil comprises a mixture of oil, water, solid impurities and an emulsion phase of oil and water and the industrial emulsion comprises an emulsion of water and oil, the slop oil purification process comprising the steps of:
providing slop oil to a slop oil centrifugal separator (5) through a first fluid connection (7) from a slop oil tank (3); and
separating water and oil in the slop oil centrifugal separator (5); and the industrial emulsion purification process comprising the steps of:
providing an industrial emulsion to an emulsion centrifugal separator (25) through a second fluid connection (27) from an industrial emulsions tank (23);
separating oil and water in the emulsion centrifugal separator; and
forwarding the oil separated in the emulsion centrifugal separator (25) to the slop oil purification process to be further processed,
wherein the slop oil and industrial emulsion purification processes operate in parallel and are combined in the same system, whereby the separated oil from the industrial emulsion purification process is transferred to the slop oil purification process for further purification.

2. A method according to claim 1, wherein the slop oil purification process further comprises the step of adding a chemical booster to the slop oil before it is provided to the slop oil centrifugal separator (5).

3. A method according to claim 1, wherein the industrial emulsion purification process further comprises the step of adding a chemical booster to the industrial emulsion before it is provided to the emulsion centrifugal separator (25).

4. A method according to claim 1, wherein the slop oil purification process further comprises the step of providing the slop oil to a decanter centrifuge (55) for separating particles and sludge from the oil before the step of providing the slop oil to the slop oil centrifugal separator (5).

5. A method according to claim 1, wherein the slop oil purification process further comprises the step of forwarding water separated from the slop oil in the slop oil centrifugal separator (5) to the industrial emulsion purification process.

6. A method according to claim 1, further comprising the steps of:
sensing a property of the oil separated in the emulsion centrifugal separator; and
forwarding the thus-separated oil back to the slop oil purification process or back to the industrial emulsion purification process in dependence of the sensed property.

7. A purification system for purification of slop oil comprising a mixture of oil, water, solid impurities and an emulsion phase of oil and water, and an industrial emulsion comprising an emulsion of water and oil, and configured to handle two processes in parallel, a slop oil purification process and an industrial emulsion purification process, said system comprising:
a slop oil centrifugal separator (5) into which slop oil is provided for separation of water and oil;
a slop oil tank (3) and a first fluid connection (7) from the slop oil tank (3) to the slop oil centrifugal separator (5);
an emulsion centrifugal separator (25) into which an industrial emulsion is provided for separation of oil and water;
an industrial emulsions tank (23) and a second fluid connection (27) from the industrial emulsions tank (23) to the emulsion centrifugal separator (25); and
a first redirecting fluid connection (37, 37') arranged for transferring oil separated from the industrial emulsion in the emulsion centrifugal separator (25) to the slop oil centrifugal separator (5).

8. A purification system according to claim 7, further comprising a booster adding means (61) arranged for providing a chemical booster to the industrial emulsion tank (23) before the industrial emulsion is provided to the emulsion centrifugal separator (25).

9. A purification system according to claim 7, further comprising a decanter centrifugal separator (55) into which the slop oil is provided before the slop oil centrifugal separator (5), said decanter centrifugal separator (55) being arranged to separate particles and sludge from the slop oil.

10. A purification system according to claim 7, further comprising a second redirecting fluid connection (39) arranged for transferring water separated from the slop oil in the slop oil centrifugal separator (5) to the emulsion centrifugal separator (25).

11. A purification system according to claim 10, wherein the industrial emulsions tank (23) is coupled to and situated between the second redirecting fluid connection (39) and the emulsion centrifugal separator (25).

12. A purification system according to claim 7, further comprising a redirection arrangement (41) provided in the first redirecting fluid connection (37; 37'), said redirection arrangement comprising a sensor (43) arranged for sensing a property of the oil separated in the emulsion centrifugal separator (25) and said redirection arrangement (41) being arranged to direct the oil either back to the slop oil centrifugal separator (5) or back to the industrial emulsions tank (23) in dependence of the sensed property.

13. A purification system according to claim 12, additionally comprising a second slop oil tank (59) coupled to and situated between the first redirecting fluid connection (37') and the slop oil centrifugal separator (5).

14. A purification system according to claim 7, wherein the slop oil tank (3) is coupled to the first redirecting fluid connection (37, 37').

15. A purification system according to claim 14, further comprising booster adding means (51) arranged for providing a chemical booster to the slop oil tank (3) before the slop oil is provided to the slop oil centrifugal separator (5).

16. A purification system for purification of slop oil and an industrial emulsions operated in parallel, wherein the slop oil comprises a mixture of oil, water, solid impurities and an emulsion phase of oil and water and the industrial emulsion comprises an emulsion of water and oil, said system comprising:
a slop oil tank (3) into which slop oil to be purified is provided;
a slop oil centrifugal separator (5) into which slop oil is provided for separation of oil and water;
a first fluid connection (7) coupling the slop oil tank (3) and the slop oil centrifugal separator (5);
an oil tank (9);
a second fluid connection (11) coupling the slop oil centrifugal separator (5) and the oil tank (9);
and emulsion centrifugal separator (25) into which an industrial emulsion is provided for separation of oil and water;
a first redirecting fluid connection (37, 37') coupling the emulsion centrifugal separator (25) and the slop oil tank (3);
an industrial emulsions tank (23);
a second redirecting fluid connection (39) coupling the slop oil centrifugal separator (5) and the industrial emulsions tank (23);
a third fluid connection (27) coupling the industrial emulsions tank (23) and the emulsion centrifugal separator (25);
a water tank (29); and
a fourth fluid connection (31) coupling the emulsion centrifugal separator (25) and the water tank (29).

17. A purification system according to claim 16, additionally comprising first booster adding means (51) coupled to the slop oil tank (3), a decanter (55) coupled between the slop oil tank (3) and the slop oil centrifugal separator (5) in the first fluid connection (7), a particle and sludge tank (57) connected to the decanter (55) for collecting contaminating particles and sludge, a second slop oil tank (59) coupled between the decanter (55) and the slop oil centrifugal separator (5) in the first fluid connection (7) and also coupled to the first redirecting fluid connection (37'), a first redirection arrangement (41) provided in the first redirecting fluid connection (37; 37'), said first redirection arrangement (41) comprising a three-way valve (45), a sensor (43) arranged for sensing a property of oil or water separated in the emulsion centrifugal separator (25) and a control system (47) arranged to direct the separated oil or water either to the second slop oil tank (59) or back to the industrial emulsions tank (23) in dependence of the sensed property, a second redirection arrangement (41) provided in the second redirecting fluid connection (39), said second redirection arrangement (41) also comprising a three-way valve (45), a sensor (43) arranged for sensing a property of fluid in the second redirecting fluid connection (39) and a control system (47) arranged to direct the fluid in the second redirecting fluid connection either to the industrial emulsions tank (23) or back to the second slop oil tank (59) if detected oil content is too large, a first extra fluid line (49) coupling the three-way valve (45) of the first redirection arrangement with the industrial emulsion tank (23), and a second extra fluid line (52) coupling the three-way valve (45) of the second redirection arrangement (41) with the second slop oil tank (59).

\* \* \* \* \*